US008122038B2

(12) United States Patent
Handy et al.

(10) Patent No.: US 8,122,038 B2
(45) Date of Patent: Feb. 21, 2012

(54) PERIOD TO DATE FUNCTIONS FOR TIME INTELLIGENCE FUNCTIONALITY

(75) Inventors: Steve Handy, Redmond, WA (US); Catalin Tomai, Bellevue, WA (US); Chen-I Lim, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 339 days.

(21) Appl. No.: 12/484,925

(22) Filed: Jun. 15, 2009

(65) Prior Publication Data

US 2010/0318545 A1 Dec. 16, 2010

(51) Int. Cl.
*G06F 7/00* (2006.01)
*G06F 17/30* (2006.01)

(52) U.S. Cl. ............... 707/758; 707/801; 707/E17.006; 707/E17.036; 707/E17.051

(58) Field of Classification Search .......... 707/600, 707/602, 713, 759, E17.006, E17.036, 758, 707/801, E17.051
See application file for complete search history.

(56) References Cited

U.S. PATENT DOCUMENTS

| 6,397,195 | B1 | 5/2002 | Pinard et al. | |
|---|---|---|---|---|
| 6,493,708 | B1* | 12/2002 | Ziauddin et al. | 707/999.003 |
| 7,003,504 | B1* | 2/2006 | Angus et al. | 707/999.001 |
| 2003/0126143 | A1* | 7/2003 | Roussopoulos et al. | 707/100 |
| 2005/0251513 | A1* | 11/2005 | Tenazas | 707/3 |
| 2006/0020608 | A1 | 1/2006 | D'Hers et al. | |
| 2006/0253475 | A1* | 11/2006 | Stewart et al. | 707/100 |
| 2007/0011310 | A1* | 1/2007 | Brady et al. | 709/224 |
| 2007/0239769 | A1 | 10/2007 | Fazal et al. | |
| 2007/0255681 | A1 | 11/2007 | Tien et al. | |
| 2008/0027970 | A1* | 1/2008 | Zhuge et al. | 707/102 |
| 2008/0270363 | A1* | 10/2008 | Hunt et al. | 707/3 |
| 2009/0006370 | A1* | 1/2009 | Li et al. | 707/5 |
| 2009/0228485 | A1* | 9/2009 | Handy et al. | 707/7 |
| 2010/0082525 | A1* | 4/2010 | Wilhite | 707/602 |
| 2010/0318545 | A1* | 12/2010 | Handy et al. | 707/759 |

OTHER PUBLICATIONS

Wang et al.—"Evolve: An Open Extensible Software Visualization Framework"—SOFTVIS'03—The Proceedings of the 2003 ACM Symposium on Software Visualization—2003, ACM (pp. 37-46:1-11).*
Barni et al.—"Cartographic Image Watermarking Using Text-Based Normalization"—Multimedia Signal Processing 2001 IEEE Fourth Workshop Oct. 3-5, 2001 (pp. 231-236:1-6).*
Barclay, N., "PPS M&A—Intelligent Time Intelligence," http://nickbarclay.blogspot.com/2007/05/pps-m-intelligent-time-intelligence.html, 2007 (5 pages).

(Continued)

*Primary Examiner* — Thu-Nguyet Le
*Assistant Examiner* — Anh Ly
(74) *Attorney, Agent, or Firm* — Perkins Coie LLP (57) ABSTRACT

A system for extending a Time Intelligence language to provide support for period-to-date functions and for generating member sets in response to data queries is provided. The system may apply member aggregation functions and queries across a plurality of heterogeneous data sources. Each data source is aligned to a reference dimension and is said to organize data according to at least one level of granularity. In some embodiments, a member aggregation function specifies a period (e.g., year, quarter, month) and retrieves data from a data source starting with the current specified period and ending with the most recently completed period equal to the granularity of the data source. The system may allow a user to further customize a member aggregation function by specifying a granularity, a period offset, or a granularity end offset. Additionally, the system may generate a caption to display in association with the retrieved data.

13 Claims, 11 Drawing Sheets

OTHER PUBLICATIONS

Pearson, W., "Featured Database Articles," Database Journal, http://www.databasejournal.com/features/mssql/article.php/3664461/Mastering-Enterprise-BI—Time-Intelligence-Pt-II.htm, 2007 (8 pages).

Russo, M., "DateTool Dimension: An Alternative Time Intelligence Implementation," SQL Blog, http://sqlblog.com/blogs/marco_russo/archive/2007/09/02/datetool-dimension-an-alternative-time-intelligence-implementation.aspx, 2007 (15 pages).

"Business Intelligence and Data Warehousing in SQL Server 2005," http://www.cnblogs.com/waxdoll/archive/2005/05/11/152983.html, 2004 (25 pages).

"Using Windows Live to Manage my Son's Baseball Team," Windows Live, http://sqlrules.spaces.live.com/, 2009 (85 pages).

* cited by examiner

PERIOD TO DATE FUNCTIONS FOR TIME INTELLIGENCE FUNCTIONALITY

BACKGROUND

Enterprise performance management ("EPM") software is a type of software used by many companies to measure and optimize business performance. EPM software analyzes data related to a number of metrics or key performance indicators ("KPIs") used to monitor a company's progress toward short-term and long-term goals. For example, a company may track the number of new customers acquired during the previous year to monitor the performance of the company's marketing initiatives. As another example, a company may use EPM software to track revenue over several years to monitor growth. Because a company may use data from a number of heterogeneous sources, each of which may categorize and organize data differently, it can be difficult to ensure that data is accurately retrieved from disparate data sources when retrieving data from multiple sources.

Disparate data sources and data types can introduce significant problems to corporate employees tasked with consolidating information into cognizable reports, when attempting to ascertain the health of the company, for example. Moreover, the costs and resources required for determining and monitoring the "wellness" (or lack thereof of the company can be significant. For example, metrics involved with the generation of KPIs provide a means for assembling a scorecard to assist a company in defining and measuring corporate wellness by assessing progress toward organizational as well as corporate goals.

In one complex business analysis example, a business user may need to report on the health of a company by compiling and analyzing information over four different corporate business groups (e.g., finances, customers, staffing, and employee satisfaction). This information can be stored in different types of data sources such as multidimensional lists, online analytical processing (OLAP) cubes, hypercubes, pivot tables, databases, tabular lists, spreadsheets, etc. Furthermore, each data source may store the information at different levels of granularity. For example, one data source may store financial information on a daily basis while another data source may store information on a weekly basis. Scorecards and dashboards provide a mechanism for tapping into this data in order to provide a high-level view of various interesting aspects of corporate health. Dashboards may contain several reports or scorecards. The data sources on which each report or scorecard is based may be different for each report or scorecard. Consumers of these dashboards want to view current data, regardless of the origin of the report's or scorecard's underlying data. Furthermore, consumers want to be able to aggregate data from different data sources regardless of their granularity. Consumers also want the ability to navigate time, for example, in reports using simple filter controls such as a calendar or select list. Designers of the dashboard want the ability to align dimensions between multiple cubes and perspectives and to define dimensionality for tabular data. Accordingly, as a means to reduce costs and resources for accessing and analyzing corporate well-being, businesses desire ways in which to provide business users a quick and easy mechanism for working with complex business processes.

SUMMARY

A system and method for extending a Time Intelligence language, such as the Time Intelligence language described in U.S. patent application Ser. No. 12/044,033, herein incorporated by reference, to provide support for member aggregation functions, such as period-to-date ("PeriodToDate") functions (i.e., queries for data associated with a particular period) and for generating member sets in response to data queries is provided. In some embodiments, the system may apply member aggregation functions and queries across a plurality of heterogeneous data sources. Each data source is said to organize data according to at least one level of granularity. In some embodiments, a PeriodToDate function (a member aggregation function specifying a period (e.g., year, quarter, month)) retrieves a range of data from a data source starting with the current specified period and ending with the most recently completed period equal to the granularity of the data source. In some embodiments, a PeriodToDate function may take the form of "<period>ToDate." For example, applying YearToDate, a PeriodToDate function specifying a period of year, to a data source having a granularity of a month retrieves data corresponding to a range beginning with the current year and ending with the previous month. In some embodiments, the system provides support for PeriodToDate functions that specify a granularity. When a PeriodToDate function specifies a granularity, the PeriodToDate function retrieves a range of data beginning with the current specified period and ending with the most recently completed period equal to the specified granularity. In some embodiments, the system provides support for PeriodToDate functions that specify a period offset. A period offset shifts the range of retrieved data a corresponding number of periods. In some embodiments, the system provides support for PeriodToDate functions that specify a granularity end offset. When a PeriodToDate function specifies a granularity end offset, the end of the range of data retrieved is adjusted. In some embodiments, the system may generate a caption to display in association with the retrieved data.

This Summary is provided to introduce a selection of concepts in a simplified form that are further described in the Detailed Description. This Summary is not intended to identify key features or essential features of the claimed subject matter, nor is it intended to be used as an aid in determining the scope of the claimed subject matter.

DETAILED DESCRIPTION

A system and method for extending a Time Intelligence language, such as the Time Intelligence language described in U.S. patent application Ser. No. 12/044,033, to provide support for member aggregation functions, such as period-to-date ("PeriodToDate") functions, and queries and for generating member sets in response to data queries is provided. In some embodiments, the system may apply PeriodToDate functions and queries across a plurality of heterogeneous data sources. Each data source is said to store data at a granularity (e.g., a day) and may aggregate data into aggregated granularities (e.g., month and/or quarters). For example, one data source may store data at five levels of granularity, day, week, month, quarter, and year, with the data source's granularity being a day and its aggregated granularities being week, month, quarter, and year while another data source may store data only by quarter. Furthermore, certain data sources may be able to dynamically aggregate data at less granular levels than the levels of granularity at which the data is stored. For example, a data source that only stores data by quarter may be able to aggregate data from each of the four quarters of a particular year in order to provide data for a year. In some embodiments, a PeriodToDate function specifies a period (e.g., year, quarter, month) and retrieves data from a data source starting with the current specified period and ending with the most recently completed period equal to the granularity of the data source. In some embodiments, a PeriodToDate function may take the form of "<period>ToDate." For example, applying YearToDate, a PeriodToDate function specifying a period of a year, to a data source having a granularity of a month retrieves data corresponding to a range beginning with the current year and ending with the previous month. If today were Jun. 15, 2009, applying YearToDate to a data source having a granularity of a day would retrieve a range of data beginning with Jan. 1, 2009 (the current year) and ending with Jun. 14, 2009 (the most recently completed day). If today were Jun. 15, 2009, applying YearToDate to a data source having a granularity of a month would retrieve a range of data beginning with Jan. 1, 2009 (the current year) and ending with May 31, 2009 (the most recently completed month). If today were Jun. 15, 2009, applying YearToDate to a data source having a granularity of a quarter would retrieve a range of data beginning with Jan. 1, 2009 (the current year) and ending with Mar. 31, 2009 (the most recently completed quarter).

Some organizations may have a fiscal year (i.e., a twelve-month period that an organization uses for financial planning) that differs from a standard or common calendar year (e.g., a Gregorian calendar year). For example, a company may have a fiscal year that runs from July to June. Applying FiscalYearToDate, a PeriodToDate function specifying a period of a fiscal year, to a data source having a granularity of a month retrieves data corresponding to a range beginning with the current fiscal year and ending with the previous month. If today were Jun. 15, 2009, applying FiscalYearToDate to a data source having a granularity of a day and associated with a company having a fiscal year that runs from July to June would retrieve a range of data beginning with Jul. 1, 2008 (the current fiscal year) and ending with May 31, 2009 (the most recently completed month).

As another example, QuarterToDate (i.e., a PeriodToDate function specifying a period of a quarter) applied to a data source having a granularity of a day retrieves data corresponding to a range beginning with the current quarter and ending with the previous day. If today were Jun. 15, 2009, applying QuarterToDate to a data source having a granularity of a day would retrieve a range of data beginning with Apr. 1, 2009 (the current quarter) and ending with Jun. 14, 2009 (the most recently completed day).

As another example, DayToDate, a PeriodToDate function specifying a period of a day, applied to a data source having a granularity of an hour retrieves data corresponding to a range starting with the current day and ending with the most recently completed hour. If it were Jun. 15, 2009 at 11:30 a.m., applying DayToDate to a data source having a granularity of an hour would retrieve data covering a range from Jun. 15, 2009 at 12:00:00 a.m. (the current day) to Jun. 15, 2009 at 10:59:59 a.m. (end of most recently completed hour).

In some embodiments, the system provides support for PeriodToDate functions that specify a granularity. When a PeriodToDate function specifies a granularity, the PeriodToDate function retrieves a range of data beginning with the current specified period and ending with the most recently completed period equal to the specified granularity. In other words, the function retrieves data based on the specified granularity as opposed to the granularity of the data source. In some embodiments, a PeriodToDate function may take the form of "<period>ToDate.Full<granularity>." For example, a YearToDate.FullQuarter, a PeriodToDate function specifying a period of a year and a granularity of a quarter, applied to a data source having a granularity of a month would retrieve a range of data beginning with the current year and ending with the previous quarter. If today were Jun. 15, 2009, YearToDate.FullQuarter would retrieve a range of data beginning with Jan. 1, 2009 and ending with Mar. 31, 2009. In addition to allowing a user to specify how the data is aggregated upon retrieval from a data source (or data sources), specifying a granularity also allows a user to ensure that the information retrieved from different data sources having different granularities will cover the same range. For example, if a first data source has a granularity of a day and a second data source has a granularity of a month, a year-to-date function applied to the first data source will cover a range that ends with the previous day while a year-to-date function applied to the second data source will retrieve data corresponding to a range that ends with the previous month. If a user specifies a granularity of a month in the PeriodToDate function, however, the data retrieved from each source will cover the same range (i.e., ending with the previous month). In some embodiments, an error may occur if a PeriodToDate function specifies a granularity that is more granular than the granularity of the data source. For example, if a year-to-date function specifying a granularity of a day is applied to a data source having a granularity of a month, the system may inform a user that the function cannot be applied to the data source.

In some embodiments, the system provides support for PeriodToDate functions that specify a period offset. A period offset shifts the range of retrieved data a corresponding number of periods. In some embodiments, a PeriodToDate function may take the form of "<period>ToDate+<periodoffset>." For example, applying YearToDate−1, a PeriodToDate function specifying a period of a year and a period offset of −1, to a data source with a granularity of a month, retrieves information corresponding to a range beginning with the previous year and ending with the previous month of the previous year. If today were Jun. 15, 2009, then the previous month of the previous year would be May 2008 and applying YearToDate−1 to a data source with a granularity of a month would retrieve information corresponding to a range beginning with Jan. 1, 2008 and ending with May 31, 2008. As another example, applying YearToDate−3 to a data source with a granularity of a quarter retrieves information corresponding to a range beginning three years ago and ending with the previous quarter three years ago. If today were Jun. 15, 2009, then the previous quarter three years ago would be the first quarter of 2006 and applying YearToDate−3 to a data source with a granularity of a quarter would retrieve a range of data beginning with Jan. 1, 2006 and ending with Mar. 31, 2006. Period offsets allow a user to retrieve information corresponding to a range parallel to a current range.

In some embodiments, the system provides support for PeriodToDate functions that specify a granularity end offset. When a PeriodToDate function specifies a granularity end offset, the end of the range of data retrieved is adjusted. In some embodiments, a PeriodToDate function may take the form of "<period>ToDate.Full<granularity>+granularityendoffset." For example, applying YearToDate.FullMonth−1, a PeriodToDate function specifying a period of a year, a granularity of a month, and a granularity end offset of −1, retrieves a range of data beginning with the current year and ending one month earlier than if there had been no offset (i.e., two months ago). If today were Jun. 15, 2009, YearToDate.FullMonth−3 would retrieve a range of data beginning with Jan. 1, 2009 and ending with Feb. 28, 2009. In some embodiments, a PeriodToDate function may take the form of "(<period>ToDate+<periodoffset>).Full<granularity>+granularityendoffset." For example, if today were Jun. 15, 2009, (SemesterToDate−1).FullMonth−1 would retrieve a range of data beginning with Jul. 1, 2008 and ending with Oct. 31, 2008.

In some embodiments, the system may generate a caption to display in association with the retrieved data. For example, in response to retrieving data for a year-to-date function, the system may generate the caption "2009 To Date" to display in the title bar of a window displaying the retrieved data. As another example, the caption "Q3 To Date" may be displayed with data retrieved by a quarter-to-date function. In some embodiments, the caption may include an indication of a specified granularity. For example, the caption "2008 To Date by Quarter" or "Q4 To Date by Month" may be displayed with results of a PeriodToDate function. In some embodiments, when a specified period offset is used, the caption may include an indication of the offset. For example, the caption "Parallel Year to Date (2008) by Day" may be displayed with results of a year-to-date function with a specified period offset a specified granularity.

Figure 1:
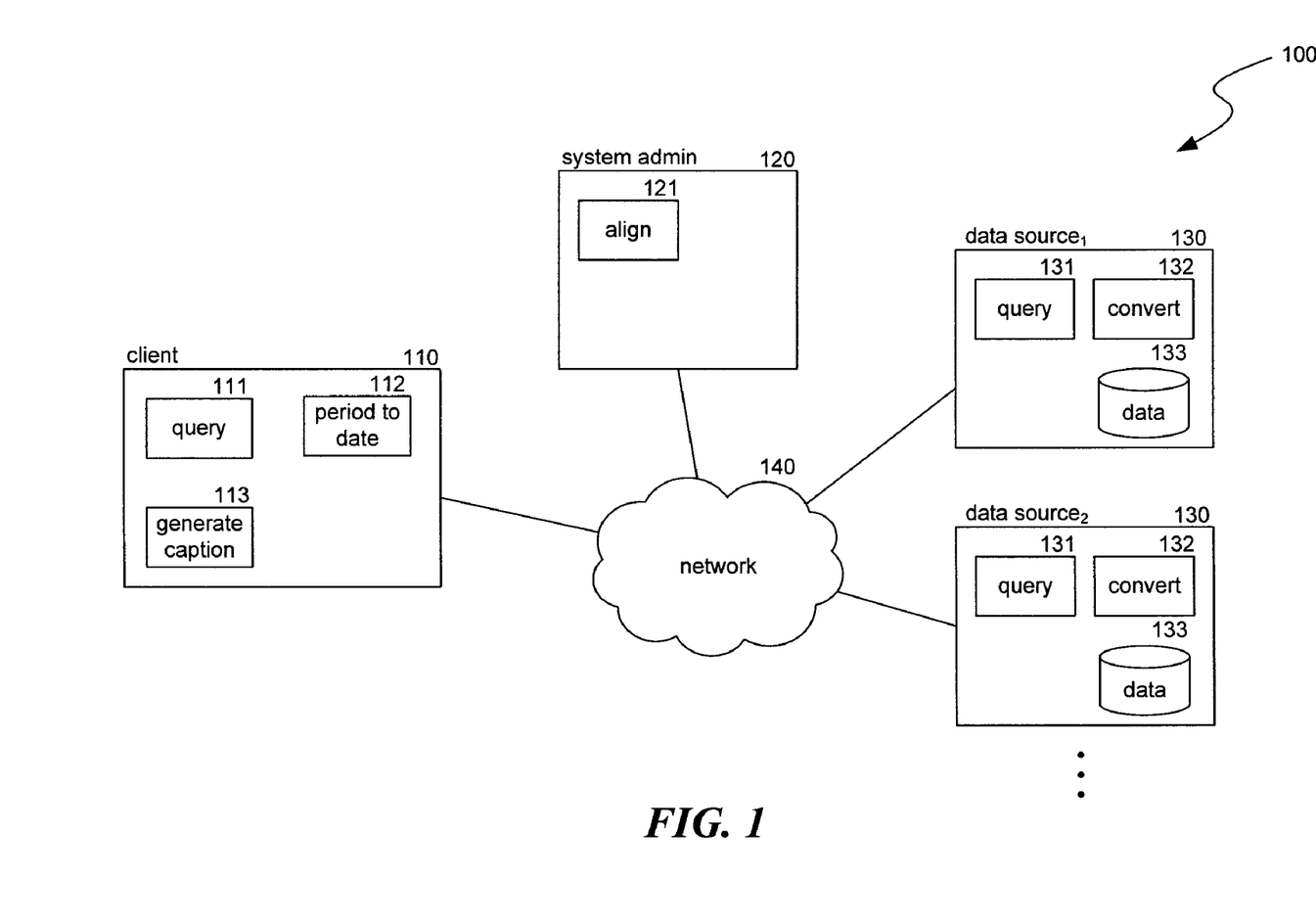
FIG. 1 is a block diagram illustrating a system for extending a Time Intelligence language in some embodiments.

FIG. 1 is a block diagram illustrating a system for extending a Time Intelligence language in some embodiments. The system 100 includes client computer 110, system admin computer 120, and data sources 130. Client computer 110 includes query component 111, PeriodToDate component 112, and generate caption component 113. Query component 111 processes queries received from a user at client computer 110. PeriodToDate component 112 processes PeriodToDate functions received from a user at client computer 110. Generate caption component 113 generates a caption to display in association with results retrieved by PeriodToDate component 112. System admin computer 120 includes align component 121. Align component 121 aligns a number of data sources to a reference dimension. Each data source 130 includes query component 131, convert component 132, and data store 133. Query component 131 processes queries for data stored in data store 133. Convert component 132 converts a value in a reference dimension to a data source value, and vice versa, based on the alignment between the data source and the reference dimension. Client computer 110, system admin computer 120, and data sources 130 are each connected via network 140.

The computing devices on which the system 100 is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the diagramming system, which means a computer-readable medium that contains the instructions. In addition, the instructions, data structures, and message structures may be stored or transmitted via a data transmission medium, such as a signal on a communication link and may be encrypted. Various communication links may be used, such as the Internet, a local area network, a wide area network, a point-to-point dial-up connection, a cell phone network, and so on.

Embodiments of the system may be implemented in and used with various operating environments that include personal computers, server computers, handheld or laptop devices, multiprocessor systems, microprocessor-based systems, programmable consumer electronics, digital cameras, network PCs, minicomputers, mainframe computers, computing environments that include any of the above systems or devices, and so on.

The system 100 may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
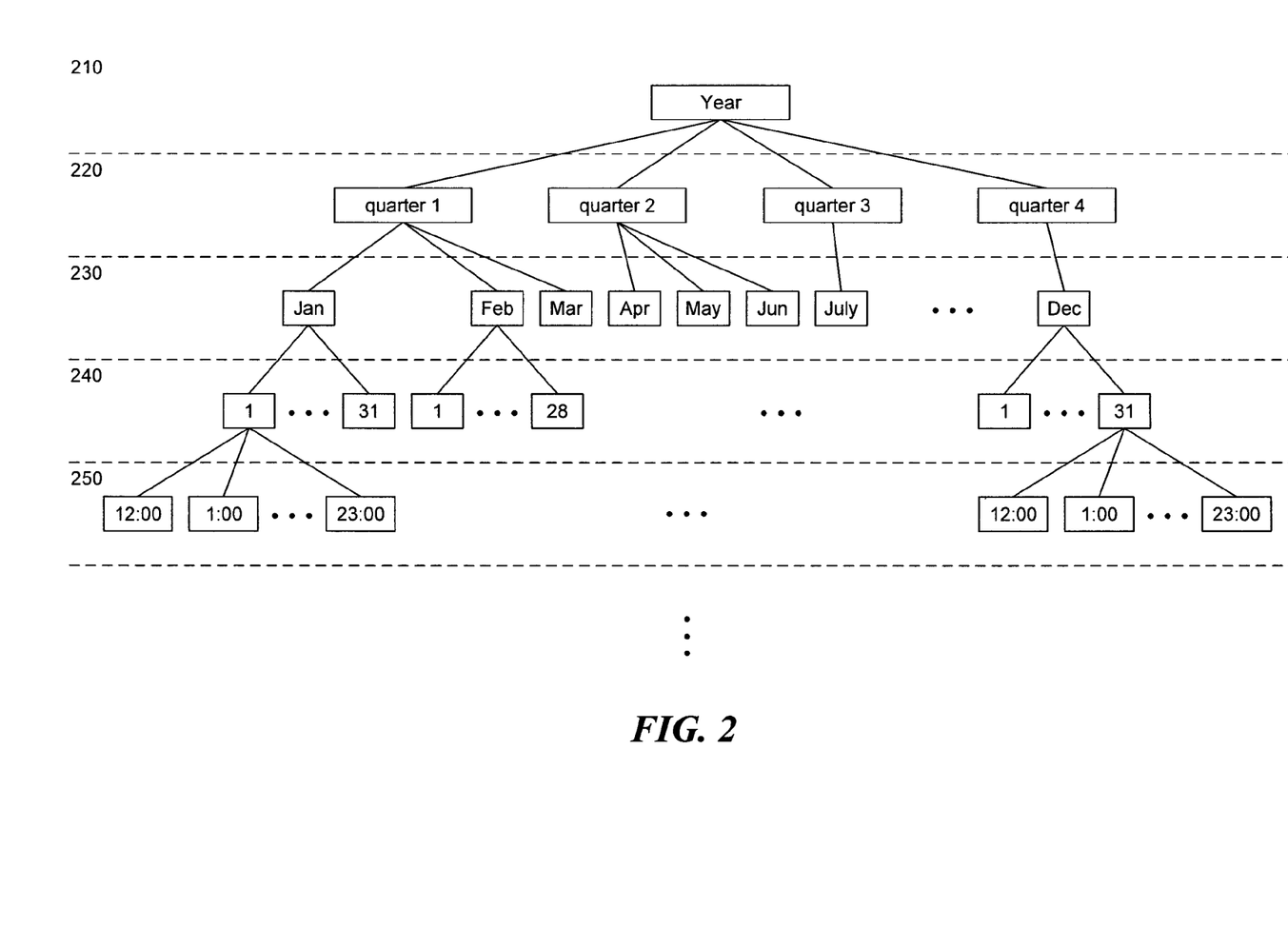
FIG. 2 is a block diagram illustrating the relationships between different levels of granularity that a data source may use to organize data in some embodiments.

FIG. 2 is a block diagram illustrating the relationships between different levels of granularity that a data source may use to organize data in some embodiments. In this example, each level of granularity corresponds to a different unit of time. Data associated with one level of granularity is an aggregation of data associated with each of the related more granular levels. In some embodiments, data at each level of granularity may be aggregated dynamically. For example, in response to a user request for data at the year level, all of the data associated with that year may be collected and retrieved for the user. In some embodiments, data at each level of granularity may be aggregated and stored periodically, for example, at the end of each day, month, quarter, etc. The data source may also use a combination of periodic and dynamic aggregations. Granularity level 210 corresponds to data aggregated according to years (e.g., any time period equaling a Gregorian calendar year), the least granular level in this example. Data aggregated at granularity level 210 is associated with the same year. Although a single year is shown, a data source may include data for multiple years. Furthermore, a data source may include less granular levels than year (e.g., decade, century, millennium, etc.). Granularity level 220 corresponds to data aggregated according to each quarter (i.e., a three-month period that divides a year into four periods) of the associated year. Data at granularity level 220 is aggregated according to each of the four quarters of an associated year. Granularity level 230 corresponds to data aggregated according to each month (e.g., one of the Gregorian calendar months) of an associated quarter. Data at granularity level 230 is aggregated according to each of the three months of the associated quarter (e.g., January, February, and March may correspond to the first quarter, April, May, and June to the second quarter, and so on). Granularity level 240 corresponds to data aggregated according to each day (e.g., a standard 24-hour day, including adjustments for daylight saving time) of an associated month. Data at granularity level 240 is aggregated according to each day of the associated month (e.g., 1 to 31 for January, 1 to 28 for February (in a non-leap year), and so on). Data at granularity level 250 is aggregated according to each hour of an associated day (e.g., each hour of a day from the hour starting at 12:00 a.m. to the hour starting at 11:00 p.m.). Although the relationships between five levels of granularity are shown in this example, a data source may provide for the aggregation of data at more or fewer levels of granularity than shown. For example, a data source may provide for aggregation at only the year and month levels. As another example, a data source may provide for aggregations at the decade, year, semester, trimester, quarter, month, week, day, hour, minute, and second, fiscal week, etc., levels. In some embodiments, the aggregations may not be hierarchical. For example, a data source may provide for aggregations according to months and weeks such that some weeks include data from two different months.

Figure 3:
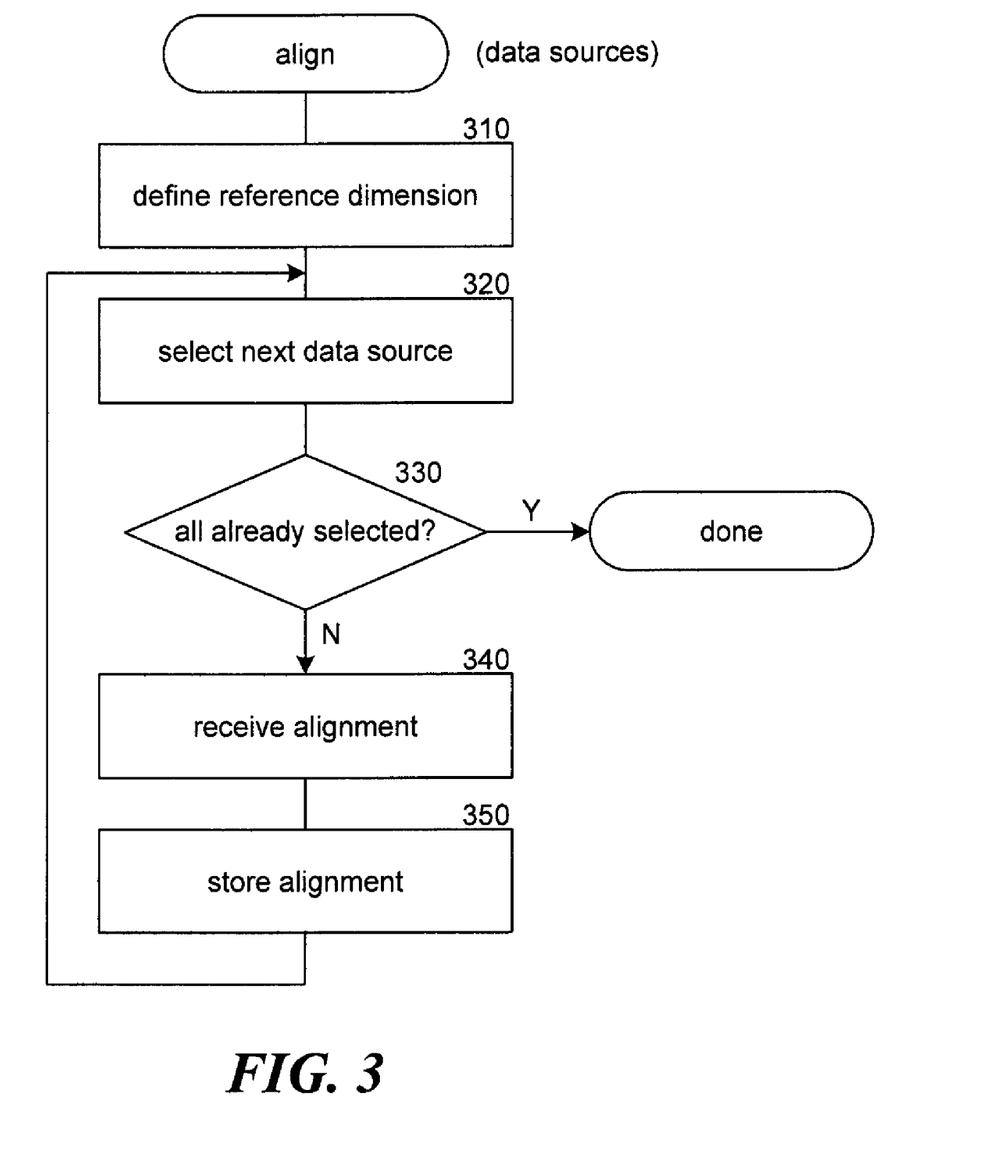
FIG. 3 is a flow diagram illustrating the processing of an align component in some embodiments.

FIG. 3 is a flow diagram illustrating the processing of an align component in some embodiments. The component is invoked to align a number of data sources to a reference dimension. Data sources may organize data according to some monotonically ordered set (e.g., day may be organized by some unit of time such as decade, year, quarter, month, week, day, hour, minute, second). Because the sets are monotonically ordered, values within the set occur at regular intervals. Furthermore, comparison operators (e.g., greater than (>), less than (<), equal to (==)) and mathematical operations (e.g., addition and subtraction) can be applied to values within the ordered set to compare and shift between values in the set. However, each data source may represent the values within the ordered set differently. For example, two data sources may organize data according to date, one data source representing each day using a "MM/DD/YYYY" format (i.e., 01/02/2009 for Jan. 2, 2009, 06/15/2009 for Jun. 15, 2009, and so on) while the other data source uses a "DD-MM-YY" format (e.g., 02-01-09 for Jan. 2, 2009, 15-06-2009 for Jun. 15, 2009, and so on). A user can align these data sources to a reference dimension (e.g., the Gregorian calendar) by selecting an arbitrary value within each data source and associating that value with a corresponding value within the reference dimension. Using the data sources described above as an example, 01/02/2009 of one data source and 02-01-09 in another data source could each be associated with Jan. 2, 2009 of the Gregorian calendar. Because the data set is ordered monotonically, the system can convert a value in a data source to a corresponding value in the reference dimension by determining the difference between the value in the data source (i.e., a value in the data source dimension) and the value in the data source used to align the data source to the reference dimension and then applying this difference to the value in the reference dimension used to align the data source to the reference dimension. For example, 01/02/2009 in the above example could be converted to the reference dimension by calculating the difference between 01/02/2009 and 01/09/2009 and applying that difference to Jan. 2, 2009. A similar technique can be used to convert values in the reference dimension to values in a data source. Once the data sources are aligned to the reference dimension, queries for data identifying a value, or a range of values, in the reference dimension can be properly converted to retrieve data from each data source. In block 310, the component defines the reference dimension. The reference dimension corresponds to a monotonically ordered set of values (i.e., a sequence of values in which the difference between each successive value remains constant). For example, the reference dimension may be defined as the Gregorian calendar. As another example, the reference dimension may be defined as a standard number line. In block 320, the component selects the next data source. In decision block 330, if all of the data sources have already been selected, then processing of the component ends, else the component continues processing at block 340. In block 340, the component receives an alignment for the selected data source. The alignment maps a value in the selected data source to a corresponding value in the reference dimension. For example, the representation of a date in the data source may be associated with the corresponding date in the Gregorian calendar. In block 350, the component stores the alignment by, for example, storing the association of the aligned values (i.e., the value in the data source and the value in the reference dimension used for the alignment). The component then loops back to block 320 to select the next data source. Once the data sources are aligned to the reference dimension, queries for data identifying a value, or a range of values, in the reference dimension can be properly converted to retrieve data from each data source individually, concurrently, or simultaneously.

Figure 4:
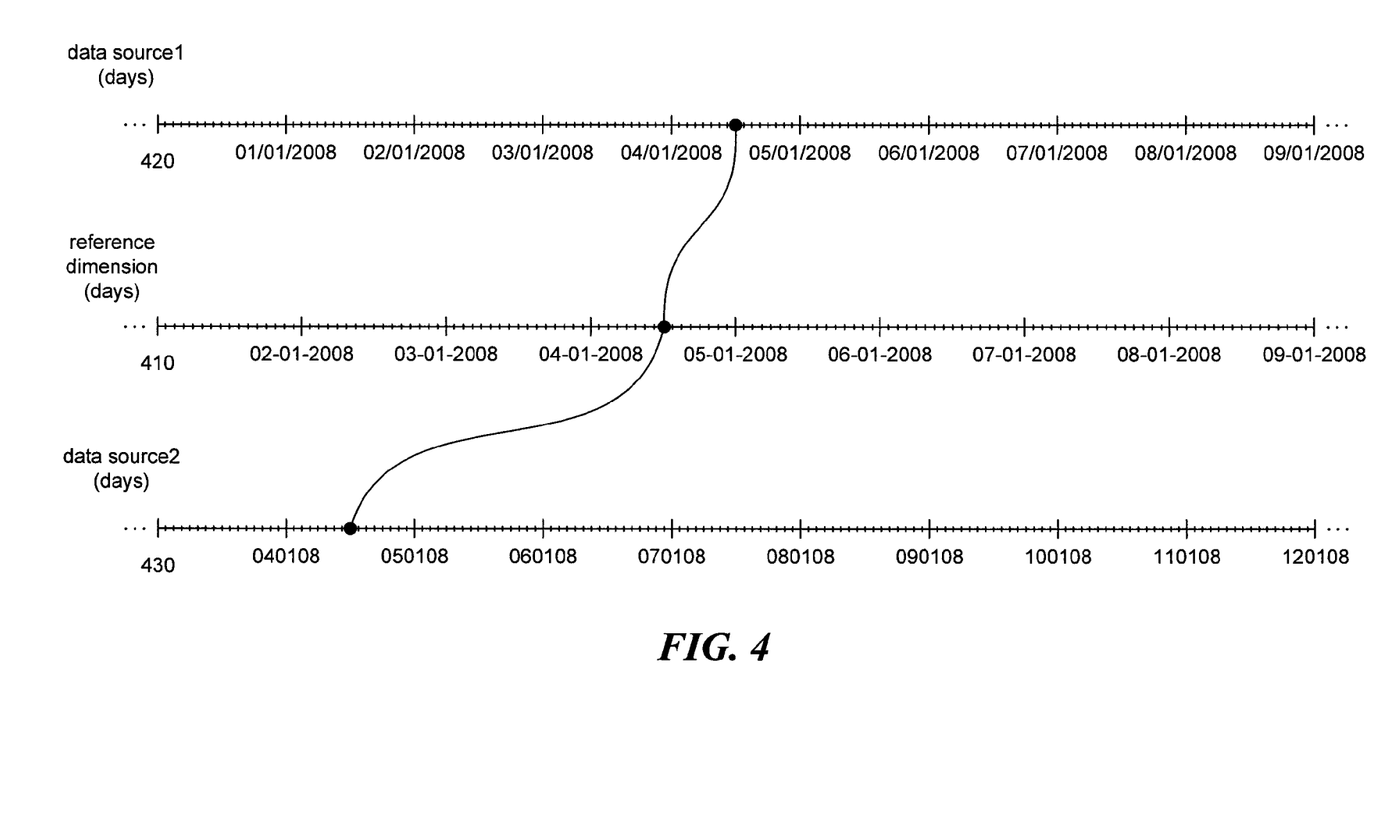
FIG. 4 is a line diagram illustrating the alignment of multiple data sources to a reference dimension in some embodiments.

FIG. 4 is a line diagram illustrating the alignment of multiple data sources to a reference dimension in some embodiments. In this example, data source1 420 and data source2 430 are each mapped to reference dimension 410 by associating the representation of Apr. 15, 2008 in data sources 420 and 430 to the corresponding date in reference dimension 410. Accordingly, data source1 420, which represents dates using an "MM/DD/YYYY" format, is aligned to the reference dimension, which represents dates using an "MM-DD-YYYY" format, by associating "04/15/2008" in data source1 420 with 04-15-2008 in the reference dimension. Similarly, data source2 430, which represents dates using an "MMD-DYY" format, is aligned to the reference dimension by associating "041508" in data source2 430 with 04-15-2008 in the reference dimension. In some embodiments, the reference dimension may correspond to a generic number line. Each data source may be aligned to the reference dimension my associating a particular value in the data source to a corresponding value in the reference dimension. For example, "01/01/2000" in data source1 and "0101000" may each be associated with the value 0 in the reference dimension. Once a data source is aligned to the reference dimension, an arbitrary value in the data source can be converted to a corresponding value in the reference dimension, and vice versa, based on the difference between the arbitrary value and the values used to align the data source to the reference dimension. In some embodiments, an indication of a data sources' granularity may also be stored with the alignment. For example, if two data sources with different granularities are mapped to the same reference dimension, the granularity may be used when converting between values within each data source.

Figure 5:
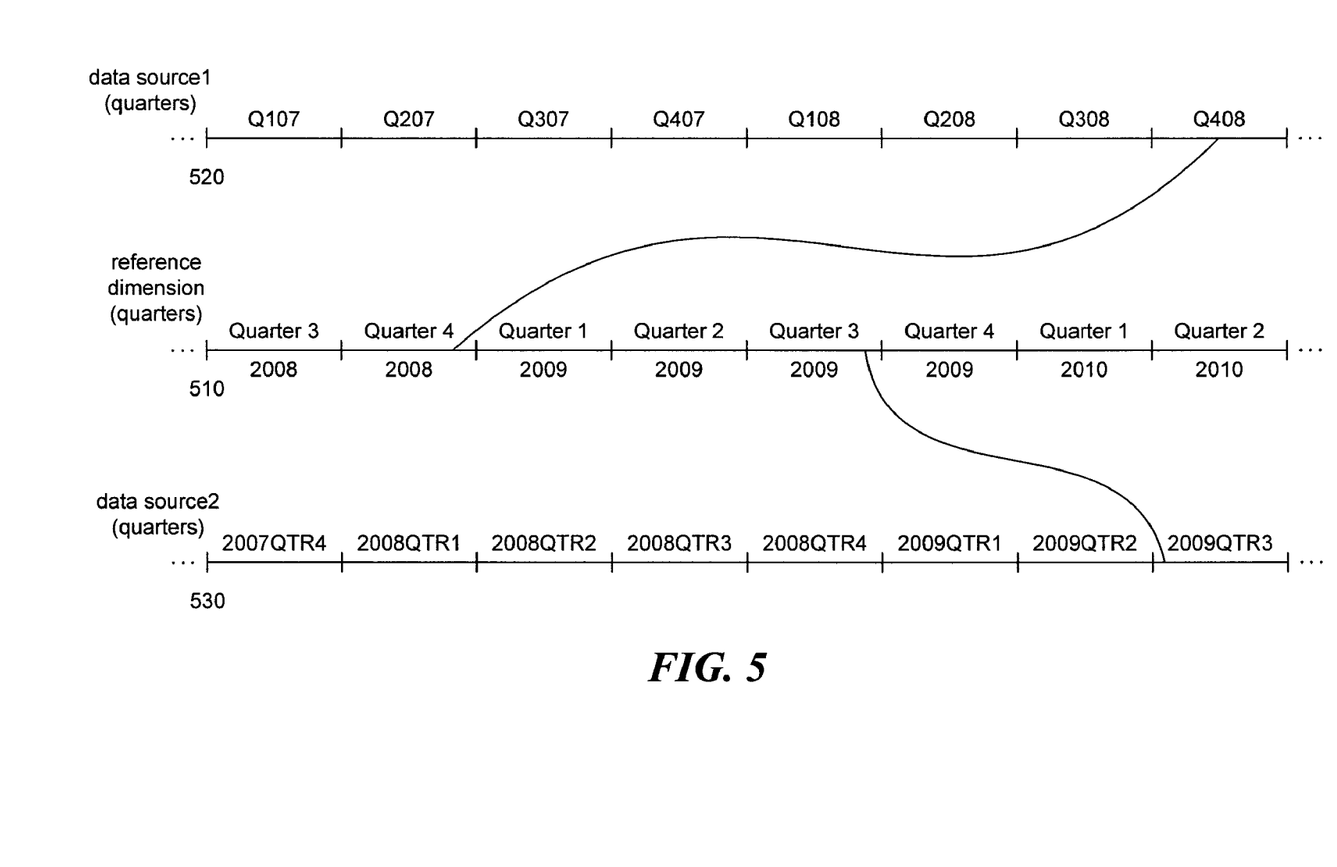
FIG. 5 is a line diagram illustrating the alignment of multiple data sources to a reference dimension in some embodiments.

FIG. 5 is a line diagram illustrating the alignment of multiple data sources to a reference dimension in some embodiments. In this example, quarters in data source1 520 and data source2 530 are each mapped to quarters in reference dimension 510. In this example, data sources 520 and 530 are mapped to different values in reference dimension 510. For example, data source1 520 is aligned to reference dimension 510 by associating "Q408" with "Quarter 4 2008" in the reference dimension while "2009QTR3" in data source2 530 is mapped to "Quarter 3 2009" in the reference dimension. Although the data sources are aligned to the reference dimension at different points, arbitrary values in each data source can be converted to a corresponding value in the reference dimension, and vice versa, based on the difference between the arbitrary value and the values used to align the data source to the reference dimension.

Figure 6:
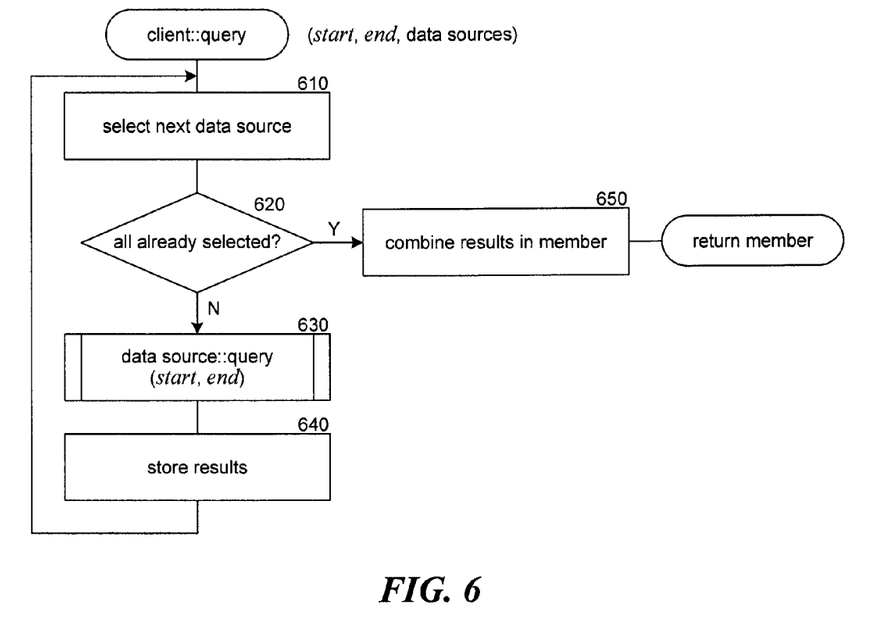
FIG. 6 is a flow diagram illustrating the processing of a query component of a client computer in some embodiments.

FIG. 6 is a flow diagram illustrating the processing of a query component of a client computer in some embodiments. The component is invoked to retrieve results from a number of data sources corresponding to a range of values (e.g., a range along the reference dimension). In block 610, the component selects the next data source. In decision block 620, if all of the data sources have already been selected, then the component continues processing at block 650, else the component continues processing at block 630. In block 630, the component invokes a query component of the selected data source. In block 640, the component stores the results retrieved from the selected data source and then loops back to block 610 to select the next data source. In block 650, the component combines the stored results into a single data member and then returns the data member. Combining the results into a single data member allows the system to use the single member, or data set, as a separate data source for querying and retrieving results. For example, the single member could be used as a target in a FROM clause of an SQL SELECT statement.

Figure 7:
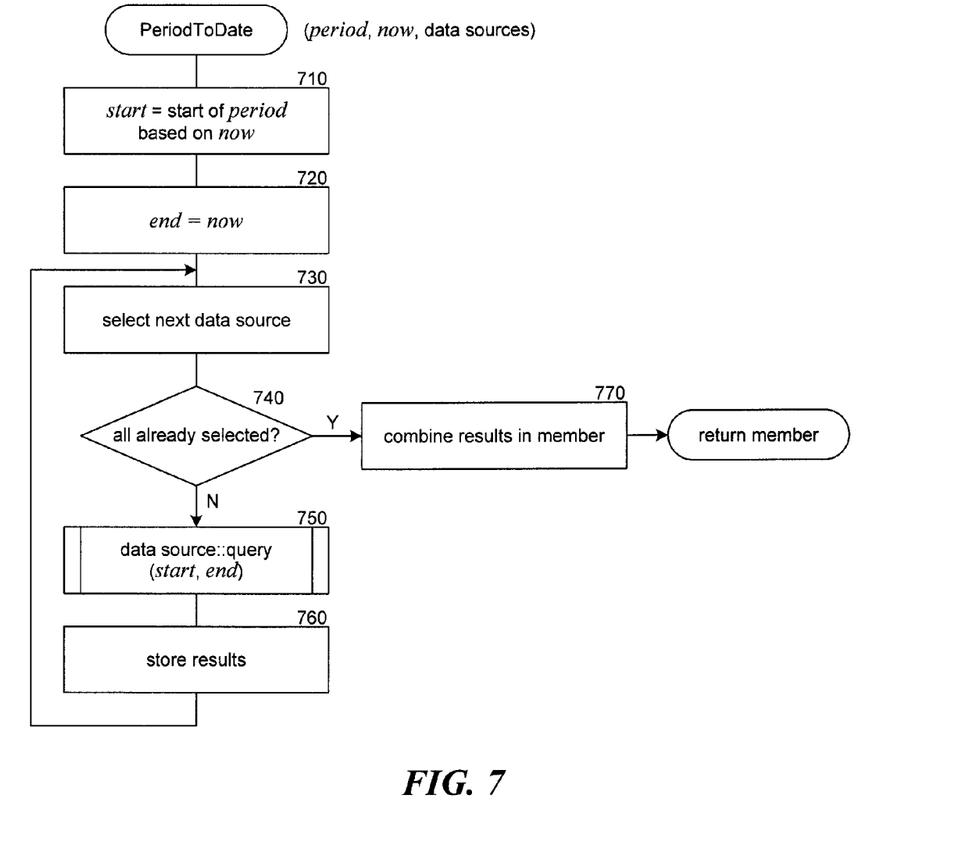
FIG. 7 is a flow diagram illustrating the processing of a PeriodToDate function in some embodiments.

FIG. 7 is a flow diagram illustrating the processing of a PeriodToDate function in some embodiments. The PeriodToDate function is passed period, now, and an indication of a number of data sources and retrieves data from those data sources corresponding to a range based on period and now. In block 710, the component sets start equal to the beginning of the most recent unit of time (in the reference dimension), equal to period, relative to now. For example, if now is equal to the current day and time and period is equal to year (e.g., YearToDate), then the beginning of the most recent year, relative to the current day and time, is the beginning of the current year. As another example, if now is equal to Jun. 20, 2000 and period is equal to month (e.g., MonthToDate), then the beginning of the most recent month is the beginning of June 2000 (i.e., Jun. 1, 2000). In block 720, the component sets end equal to now. In block 730, the component selects the next data source. In decision block 740, if all of the data sources have already been selected, then the component continues processing at block 770, else the component continues processing at block 750. In block 750, the component invokes a query component of the selected data source passing start and end to the query component of the selected data source. In block 760, the component stores the results retrieved from the selected data source and then loops back to block 730 to select the next data source. In block 770, the component combines the stored results into a single data member and then returns the data member.

Figure 8:
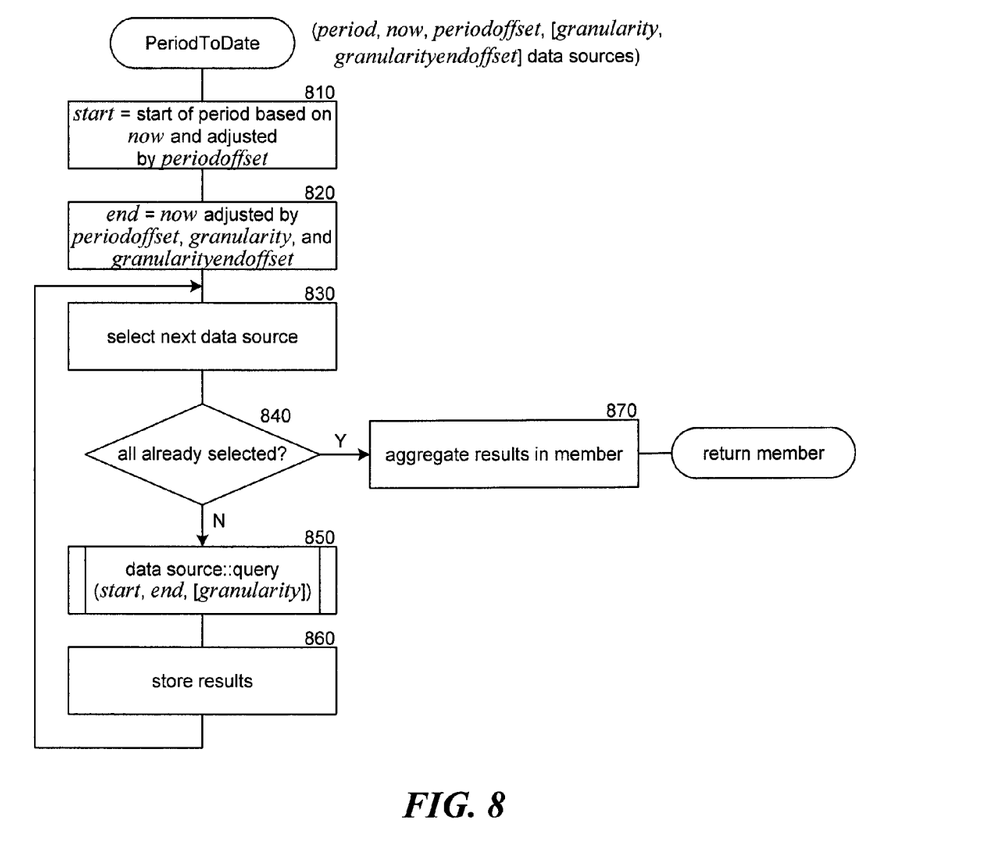
FIG. 8 is a flow diagram illustrating the processing of a PeriodToDate function in some embodiments.

FIG. 8 is a flow diagram illustrating the processing of a PeriodToDate function in some embodiments. The PeriodToDate function is passed period, now, period offset, an indication of a number of data sources and, optionally, granularity and granularityendoffset, and retrieves data from the data sources corresponding to a range based on period, now, period offset, granularity (if provided), and granularityendoffset (if provided). In block 810, the component sets start equal to the beginning of the most recent unit of time equal to period, relative to now, and adjusted by periodoffset. For example, if now is equal to the current date, period is equal to year, and periodoffset is equal to −1 (e.g., YearToDate−1), then the beginning of the most recent year, relative to the current date, is the beginning of the current year. A periodoffset of −1 shifts start one unit of time equal to period in the negative direction (i.e., earlier in time) while a periodoffset of 1 shifts start one unit of time equal to period in the positive direction (i.e., later in time). Accordingly, start would be set to the beginning of last year. As another example, if now is equal to Jun. 20, 2000, period is equal to month, and periodoffset is equal to −2 (e.g., MonthToDate−2), then start would be set to the beginning of April 2000 (i.e., Apr. 1, 2000). In block 820, the component sets end equal to now adjusted by periodoffset, granularity, and granularityendoffset. The periodoffset-based adjustment shifts end by the corresponding number of units of time equal to period. For example, if end is equal to Mar. 31, 2000, period is equal to month, and periodoffset is equal to −2 (e.g., MonthToDate−2), then end would be shifted to Jan. 31, 2000. As another example, if end is equal to May 31, 2009, period is equal to year, periodoffset is equal to −2 (e.g., YearToDate−2), then end would be shifted to May 31, 2007. The granularity-based adjustment shifts end to the end of the most recently completed unit of time equal to granularity. For example, if now is equal to the current date and granularity is equal to month (e.g., PeriodToDate.FullMonth), then end would be shifted to the end of the previous month. As another example, if now is equal to Jun. 20, 2000 and granularity is equal to quarter (e.g., PeriodToDate.FullQuarter), then end would be shifted to the end of the first quarter of 2000 (i.e., Mar. 31, 2000). The granularityendoffset-based adjustment shifts end by the corresponding number of units of time equal to granularity. For example, if end is equal to Mar. 31, 2000, granularity is equal to month, and granularityendoffset is equal to −2 (e.g., PeriodToDate.FullMonth−2), then end would be shifted to Jan. 31, 2000. As another example, if end is equal to May 31, 2009, granularity is equal to year, and granularityendoffset is equal to −2 (e.g., PeriodToDate.FullYear−2), then end would be shifted to May 31, 2007. In block 830, the component selects the next data source. In decision block 840, if all of the data sources have already been selected, then the component continues processing at block 870, else the component continues processing at block 850. In block 850, the component invokes a query component of the selected data source passing start, end, and, optionally, granularity to the query component of the selected data source. In block 860, the component stores the results retrieved from the selected data source and then loops back to block 830 to select the next data source. In block 870, the component combines the stored results into a single data member and then returns the data member.

Figure 9:
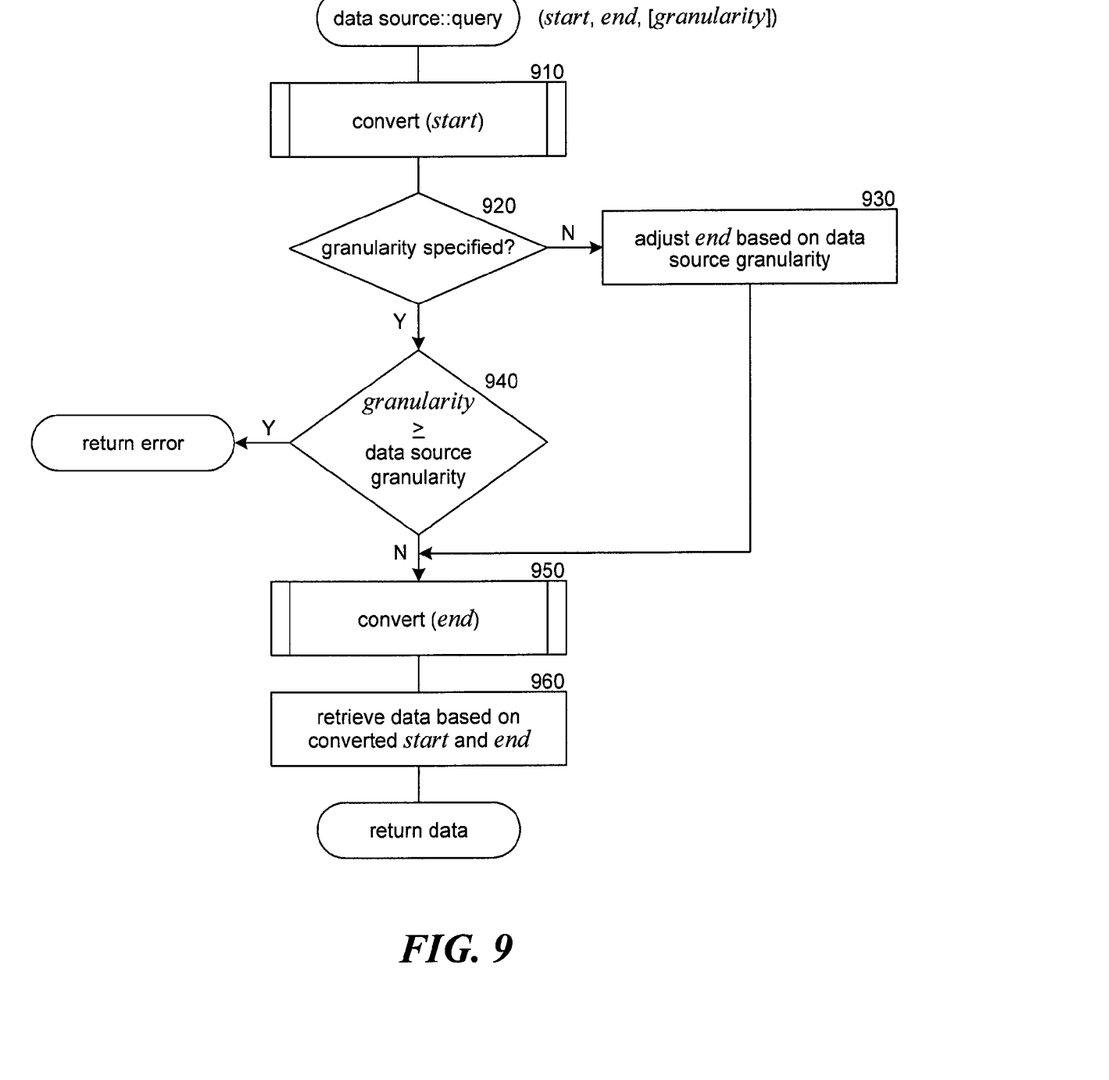
FIG. 9 is a flow diagram illustrating the processing of a query component of a data source in some embodiments.

FIG. 9 is a flow diagram illustrating the processing of a query component of a data source in some embodiments. The component is passed start (a value in a reference dimension), end (a value in a reference dimension), and, optionally, granularity, and retrieves data from the data source corresponding to the range beginning with start and ending with end in the reference dimension. In block 910, the component invokes a convert component of the data source to convert start from the reference dimension to a corresponding value of the data source. In decision block 920, if a granularity is specified, the component continues processing at decision block 940, else the component continues processing at block 930. In block 930, the component adjusts end based on the most granular level of the data source (i.e., to the end of the most recently completed unit of time, relative to end, equal to the granularity of the data source). For example, if end were equal to Jun. 15, 2009 and the granularity of the data source were month, end would be adjusted to May 31, 2009. As another example, if end were equal to Mar. 20, 2009 and the granularity of the data source were day, end would be adjusted to Mar. 19, 2009. In decision block 940, if the specified granularity is greater than or equal to the granularity of the data source, then the component returns an error and processing of the component completes, else the component continues processing at block 950. In block 950, the component invokes a convert component of the data source to convert end from the reference dimension to a corresponding value of the data source. In block 960, the component retrieves data of the data source based on the converted start and end values. For example, the component may extract information from a tabular data source or generate and execute a query against the data source, such as an SQL query, an OLAP query, etc. The component then returns the retrieved data and processing of the component completes.

Figure 10:
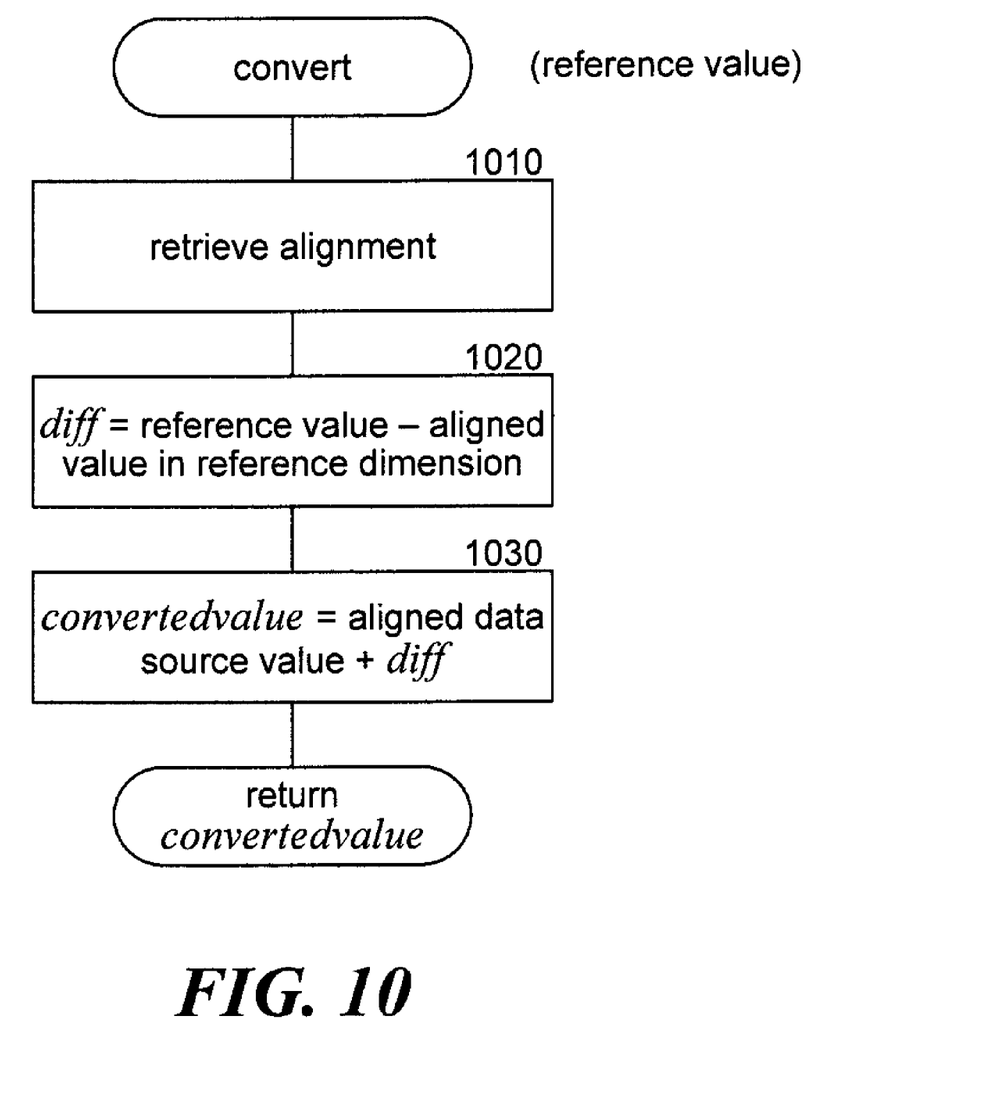
FIG. 10 is a flow diagram illustrating the processing of a convert component of a data source in some embodiments.

FIG. 10 is a flow diagram illustrating the processing of a convert component of a data source in some embodiments. The component is invoked to convert a reference value (i.e., a value in a reference dimension) to a corresponding value in the data source. In block 1010, the component retrieves an alignment of the data source to the reference dimension. For example, the alignment may be stored as a mapping of one value in the reference dimension to a value in the data source (i.e., the data source dimension). In block 1020, the component sets diff equal to reference value minus the value in the reference dimension used to align the data source to the reference dimension. In some embodiments, diff may be adjusted to reflect a difference in granularity between the data source and the reference dimension. For example, if the data source has a granularity of weeks and the reference dimension has granularity of days, diff may be adjusted by a factor of 7 to reflect this difference in granularity. In block 1030, the component sets convertedvalue equal to the value in the data source used to align the data source to the reference dimension plus diff. The component then returns convertedvalue and processing of the component completes.

Figure 11:
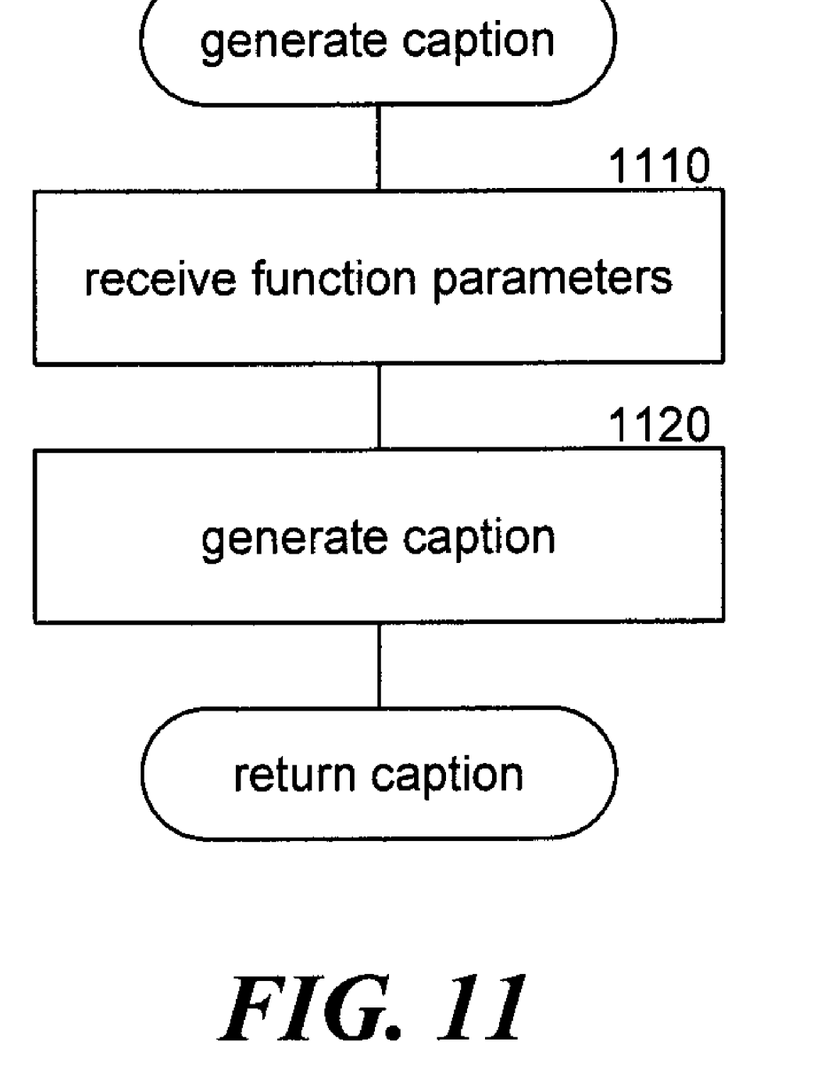
FIG. 11 is a flow diagram illustrating the processing of a generate caption component in some embodiments.

FIG. 11 is a flow diagram illustrating the processing of a generate caption component in some embodiments. The component generates a caption to display in association with data retrieved by executing a PeriodToDate function. In block 1110, the component receives PeriodToDate function parameters (e.g., now, period, periodoffset, granularity, granularityendoffset). In block 1120, the component generates a caption based on the query string. The component may generate a string of the form "<period> To Date [by <granularity>]," wherein the text within the brackets is included if a granularity is specified. For example, upon receiving YearToDate, the component may generate the caption "Year To Date." As another example, upon receiving YearToDate.FullQuarter, the component may generate the caption "Year To Date by Quarter." In some embodiments, the component may generate a caption that identifies a specific period, based on now, rather than the name of the period. For example, if now is equal to Jun. 15, 2009, the component may generate the caption "2009 To Date" for YearToDate, "June 2009 To Date" for MonthToDate, and "Q1 2009 To Date By Day" for QuarterToDate.FullDay. In some embodiments, the component may generate a caption of the form "Parallel <period> To Date (<start of range based on periodoffset>) [by <granularity>]" when a periodoffset is specified. For example, if now is equal to Jun. 15, 2009, the component may generate the caption "Parallel Year To Date (2008)" for YearToDate−1. As another example, if now is equal to Jun. 15, 2009, the component may generate the caption "Parallel Month To Date (May 2009) by Day" for (MonthToDate−1).FullDay. As another example, if now is equal to Jun. 15, 2009, the component may generate the caption "Parallel Quarter to Date (Q1 2009) by Month" for (QuarterToDate−1).FullMonth. In some embodiments, an end of the range may be included in the caption when a granularityendoffset is specified. The component then returns the generated caption and processing of the component completes.

Although the subject matter has been described in language specific to structural features and/or methodological acts, it is to be understood that the subject matter defined in the appended claims is not necessarily limited to the specific features or acts described above. For example, data sets corresponding to any monotonically ordered set of values may be mapped to a common reference dimension in order to provide conversion functionality between the data sets. In some embodiments, the technology described herein can be applied to dimensions other than a time-based dimension. For example, monetary values can be mapped to a number of denomination dimensions (pennies, nickels, dimes, quarters, dollars, five dollars, etc.). Each denomination dimension may be aligned to a reference dimension (e.g., a number line) by associating an arbitrary value in each denomination with a corresponding value in the reference dimension. Furthermore, the alignment may also include an indication of the granularity of the denomination dimension to be used when converting between the reference dimension and the denomination dimension when, for example, the granularity of the denomination dimension differs from the granularity of the reference dimension. The cost or value of a particular product may be known in a particular denomination dimension. By aligning the different denomination dimensions to a reference dimension, one can easily convert the cost or value of the product in another denomination dimension. Furthermore, different currencies (e.g., US Dollar, Euro, British Pound, Japanese Yen, etc.) may be mapped to a reference dimension used to convert between the different currencies, or currency dimensions. In some embodiments, each currency may be dynamically aligned to the reference dimension periodically. As another example, various pieces of exonumia may be mapped to a reference dimension in order provide conversion between the different pieces. Furthermore, data associated with a particular range of values in a data source dimension can be aggregated to provide a single data member for subsequent queries. The specific features and acts described above are disclosed as example forms of implementing the claims. Accordingly, the invention is not limited except as by the appended claims.

We claim:

1. A method performed by a computer having a memory and a processor for retrieving data from each of a plurality of heterogeneous data sources, the method comprising:

defining a reference dimension specifying a plurality of values;

receiving an indication of a first data source, the first data source organizing data according to a first unit of time in a first format, the first unit of time corresponding to a first granularity;

receiving an indication of a second data source, the second data source organizing data according to a second unit of time in a second format, the second unit of time corresponding to a second granularity;

with a processor, aligning the first data source to the reference dimension by selecting a value of the first unit of time in the first format of the first data source and associating the selected value of the first unit of time in the first format of the first data source with a first value of the reference dimension;

with a processor, aligning the second data source to the reference dimension by selecting a value of the second unit of time in the second format of the second data source and associating the selected value of the second unit of time in the second format of the second data source with a second value of the reference dimension;

receiving from a user a query function specifying a period;

submitting the query function to the first data source wherein the first data source is configured to determine a first range of values of the first unit of time in the first format based at least in part on the specified period, a third granularity, and the alignment of the first data source to the reference dimension;

receiving from the first data source a first set of results corresponding to the first range of values;

submitting the query function to the second data source wherein the second data source is configured to determine a second range of values of the second unit of time in the second format based at least in part on the specified period, a fourth granularity, and the alignment of the second data source to the reference dimension;

receiving from the second data source a second set of results corresponding to the second range of values; and combining the received first and second sets of results into a single data member.

2. The method of claim 1 wherein the received query function specifies a granularity and wherein the third and fourth granularities are equal to the specified granularity.

3. The method of claim 1 wherein the first granularity is different from the second granularity.

4. The method of claim 3 wherein when the first granularity is more granular than the second granularity, the third and the fourth granularities are equal to the second granularity and wherein when the second granularity is more granular than the first granularity, the third and the fourth granularities are equal to the first granularity.

5. The method of claim 1, further comprising:
receiving a second query to retrieve results from the single data member; and
retrieving results from the single data member.

6. The method of claim 1, wherein the reference dimension specifies dates of a common calendar.

7. The method of claim 1 wherein the first data source includes tabular data and wherein the second data source includes online analytical processing (OLAP) data.

8. A computer-readable storage medium containing computer-executable instructions that when executed by a computer having a memory and a processor cause the computer to perform steps for retrieving data from a plurality of data sources, the steps comprising:
with a processor, defining a reference dimension having a first set of monotonically ordered values;
receiving an alignment of a first data source to the reference dimension;
receiving an alignment of a second data source to the reference dimension;
receiving a period-to-date query corresponding to a subset of values of the first set of monotonically ordered values of the reference dimension;
submitting the period-to-date query to the first data source and the second data source;
receiving from the first data source a first set of results corresponding to the period-to-date query based at least in part on the alignment of the first data source to the reference dimension; and
receiving from the second data source a second set of results corresponding to the period-to-date query based at least in part on the alignment of the second data source to the reference dimension
wherein the first data source organizes data according to a second set of monotonically ordered values and wherein the first data source is aligned to the reference dimension by selecting an arbitrary value of the second set of monotonically ordered values and associating that selected arbitrary value with a corresponding value in the first set of monotonically ordered values, and
wherein the second data source organizes data according to a third set of monotonically ordered values and wherein the second data source is aligned to the reference dimension by selecting an arbitrary value of the third set of monotonically ordered values and associating that selected arbitrary value with a corresponding value in the first set of monotonically ordered values.

9. The computer-readable storage medium of claim 8 wherein the period-to-date query specifies a granularity and wherein the first set of results is based at least in part on the alignment of the first data source to the reference dimension and the specified granularity and wherein the second set of results is based at least in part on the alignment of the second data source to the reference dimension and the specified granularity.

10. The computer-readable storage medium of claim 9 wherein the period-to-date query specifies a period offset and wherein the first set of results is based at least in part on the alignment of the first data source to the reference dimension, the specified granularity, and the specified period offset and wherein the second set of results is based at least in part on the alignment of the second data source to the reference dimension, the specified granularity, and the specified period offset.

11. The computer-readable storage medium of claim 10 wherein the period-to-date query specifies a granularity end offset and wherein the first set of results is based at least in part on the alignment of the first data source to the reference dimension, the specified granularity, the specified period offset, and the specified granularity end offset and wherein the second set of results is based at least in part on the alignment of the second data source to the reference dimension, the specified granularity, the specified period offset, and the specified granularity end offset.

12. The computer-readable storage medium of claim 11, further comprising:
combining the received first and second sets of results into a single data member.

13. The computer-readable medium of claim 12 wherein the second set of monotonically ordered values corresponds to months and wherein the third set of monotonically ordered values corresponds to days.

* * * * *